Patented Feb. 22, 1949

2,462,684

UNITED STATES PATENT OFFICE 2,462,684

STABILIZED INDENE AND ALKYL INDENE RESINS

Frank J. Soday, Baton Rouge, La., assignor to The United Gas Improvement Company, a corporation of Pennsylvania No Drawing. Application June 20, 1944, Serial No. 541,261

6 Claims. (Cl. 260—82)

This invention is concerned with the utilization of hydrocarbon resins.

More particularly, this invention is concerned with the provision of new compositions of matter comprising a resin or mixture of resins, or a resinous copolymer, derived from one or more indene type compounds and one or more agents designed to prevent or retard the decomposition of such resinous materials.

An object of the present invention is the provision of a coating, impregnating, and/or sealing composition comprising a hydrocarbon resin and an inhibitor, either with or without the addition of one or more agents selected from a list comprising solvents, pigments, dyes, fillers, extenders, plasticizing agents, emulsifying agents, wetting agents, waxes, rubber, elastomers in general, natural resins, and synthetic resins other than hydrocarbon resins. Another object of the invention is the provision of an emulsion or a solution of a hydrocarbon resin containing one or more inhibitors, said emulsion or solution, being adapted to coat and/or impregnate organic or inorganic fibers, as well as fabrics and finished objects or articles prepared therefrom. Other objects and advantages of the invention will be apparent to those skilled in the art from an inspection of the specification and the claims.

Resins derived from unsaturated hydrocarbons, or from fractions or solutions containing one or more unsaturated hydrocarbons, form a desirable class of resinous materials due to certain particularly valuable properties possessed by such resins, among which may be listed their excellent water resistance, their outstanding dielectric properties, and their resistance to chemical attack.

The polymerization of indene and/or one or more substituted indenes, either alone or in admixture with one or more olefines, and/or diolefines leads to the production of resinous polymers possessing a number of outstanding properties. Among these unique characteristics are their excellent water resisting and dielectric properties and their durability. This latter property is manifested by the unusual resistance to atmospheric, and other, decomposition of such resins, as shown by their excellent exposure characteristics and their resistance to mechanical abrasion and stresses when used as coating materials in certain applications.

Other desirable properties of these resins are their comparatively light colors, and the ease with which their softening points may be varied by suitable changes in the polymerizing process employed.

The substituted indenes employed in the practice of my invention conform to the following formula:

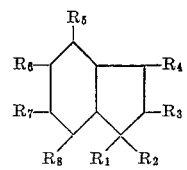

in which at least one of the group consisting of $R_1$ to $R_8$ inclusive, is an alkyl group, such as methyl, ethyl, propyl, butyl, amyl, and the like; an aryl group, such as phenyl, naphthyl, and the like; or a substituted aryl group, such as tolyl, xylyl, methyl phenyl, and the like; the remaining groups being hydrogen.

Among the substituted indenes, the use of alkyl-substituted indenes, and more particularly the methyl substituted indenes, is preferred. Excellent results are obtained by the use of mono/methyl indene. Indene and substituted indene may be referred to hereinafter as indene-type compound.

A particularly desirable source of indene and/or substituted indene to be used in the practice of my invention is the light oil obtained upon the pyrolysis of petroleum or of petroleum hydrocarbons at temperatures in excess of 1100° F., and more particularly in excess of 1300° F., suitably in the gas phase and in the presence of steam. The condensation and fractionation of the products obtained results in the isolation of fractions containing indene and substituted indenes, the said fractions being substantially free of coumarone, and sulfur compounds.

In the case of indene, I generally prefer to employ a fraction boiling mainly in the range of 175 to 190° C., and more preferably mainly in the range of 177 to 185° C. Indene is the preponderant unsaturated hydrocarbon in such fractions.

In the case of substituted indenes, I generally prefer to employ a fraction boiling mainly in the range of 190 to 220° C.

For certain purposes, the use of narrower-boiling fractions may be desirable. Thus, I have found that particularly desirable resins for use in the applications described herein are obtained when substituted indene fractions boiling mainly in the range of (a) 190 to 200° C., (b) 200 to 210° C., and/or (c) 210 to 220° C., are employed. Extensive investigation has indicated that the preponderating unsaturated hydrocarbons present in these fractions are methyl substituted indenes.

An important commercial source of indene and substituted indene at the present time is the light oil obtained by the pyrolysis of petroleum, or of certain petroleum hydrocarbons. In particular, the light oil obtained in the manufacture of oil gas or carburetted water gas is an especially desirable and abundant source of indene and substituted indene. While the light oil obtained as a by-product of the coking industry, or of the manufacture of coal gas, also may be employed in the preparation of resins of the type described herein, I prefer to employ the light oil derived from petroleum for such purpose due to the substantially complete absence therefrom of coumarone and/or substituted coumarone.

Pure or substantially pure indene and/or substituted indene, or mixtures thereof, may be used for the production of resins of the type described herein, although I generally prefer to employ light oil fractions containing one or more of such compounds.

Any dicyclopentadiene or substituted dicyclopentadienes present in such fractions preferably is removed prior to polymerization by any method known in the art, such as by pyrolysis at elevated temperatures, suitably in the presence of steam, by fractionation, or otherwise.

A particularly desirable source of indene and/or substituted indene to be used in the practice of my invention is the light oil obtained upon the pyrolysis of petroleum or of petroleum hydrocarbons at temperatures in excess of 1100° F., and more particularly in excess of 1300° F., suitably in the gas phase and in the presence of steam. The condensation and fractionation of the products obtained results in the isolation of fractions containing indene and substituted indenes, the said fractions being substantially free of coumarone, and sulfur compounds.

In the case of indene, I generally prefer to employ a fraction boiling mainly in the range of 175 to 190° C., and more preferably mainly in the range of 177 to 185° C.

In the case of substituted indenes, I generally prefer to employ a fraction boiling mainly in the range of 190 to 220° C.

For certain purposes, the use of narrower-boiling fractions may be desirable. Thus, I have found that particularly desirable resins for use in the applications described herein are obtained when substituted indene fractions boiling mainly in the range of (a) 190 to 200° C., (b) 200 to 210° C., and/or (c) 210 to 220° C., are employed. Extensive investigation has indicated that the proponderating unsaturated hydrocarbons present in these fractions are methyl substituted indene.

Such light oil fractions may contain olefines other than indene and/or substituted indene, and may contain minor proportions of diolefines.

Although light oil fractions containing any desired concentration of indene-type compound may be employed, the use of fractions containing from 40% to 98% of such unsaturated hydrocarbons gives especially desirable results.

The polymerization preferably is carried out in the presence of an aliphatic, aromatic, or other solvent. In case an aromatic solvent is employed, an appreciable quantity of such solvent may be incorporated in the resin obtained.

While a number of catalysts may be employed for the conversion of indene-type compounds or fractions containing such indene-type compounds to resinous polymers of the type described herein, I prefer to employ acid-acting metallic halides and/or acid-acting metallic halide-organic solvent complexes for this purpose. Excellent results are secured by the use of aluminum chloride or boron trifluoride-organic solvent complexes for the polymerization of indene-type compounds.

In addition, other catalysts may be used for the polymerization of indene-type compounds with excellent results. Examples of such catalysts are contact agents, such as clay, activated clay, silica gel, alumina, and the like; mineral acids, such as sulfuric and phosphoric acids; and mineral acid-organic solvent mixtures, such as sulfuric acid-ether and sulfuric acid-alcohol mixtures and/or reaction products.

The temperature employed in the reaction also has a considerable effect upon the characteristic of the resinous polymer obtained. In general, a reduction of the polymerizing temperature results in an increase in the melting point of the resin obtained.

After polymerization, the catalyst preferably is neutralized and/or removed, such as by the addition of an aqueous alkaline solution to the polymerized material, followed by filtration. The resinous material then may be isolated by any desired method, such as by distillation assisted by steam, which may be superheated, under reduced pressure.

As pointed out previously, the resinous products obtained by the polymerization of one or more indene-type compounds, or of light oil fractions containing one or more indene-type compounds are well adapted to coat and/or impregnate a variety of surfaces or materials, such as for example organic materials.

The term "organic material" as employed herein includes various materials of the character of wood pulp, paper, cardboard, textile fibers, both natural and synthetic, fabricated textile products made therefrom, leather, artificial leather, rubber, artificial rubber, molded, cast, machined, or extruded plastic products, straw plait, and the like. Usually such materials will be somewhat absorbent, and whether the particular product is coated or impregnated, or both, with the resinous material will depend on the conditions of treatment and the nature of the organic material treated.

When the term "organic fiber" is used herein without qualification, it includes the fabricated product as well as the individual fibers, and the term "fabricated product" includes products made by weaving, knitting, felting, or otherwise forming, fabricating, or manipulating the organic fibers to form an article or product. Paper, for example, is a fabricated product since it is prepared by felting the paper-making fibers.

Resinous materials of the type described herein may be applied to any desired surface by any suitable method. Thus, such resinous materials may be applied in a molten or semi-molten state, such as by the "hot melt" method of coating and/or impregnating paper; the resinous polymers may be dissolved in a suitable solvent or mixture of solvents, such as those of the hydrocarbon type, after which the resinous solution may be applied to the surface to be treated by any desired method; or the resinous polymer, either in the presence or absence of a minor quantity of a solvent and/or a plasticizing agent, may be emulsified by any of the methods known to the art, after which the aqueous resinous emulsion may be applied to the surface to be coated.

Resinous materials of the type described herein are well adapted to coat and/or impregnate textile fibers, threads, and fabrics, as well as paper, cardboard, and other fibrous products. In general, such materials are coated and/or impregnated to improve their hard water resistance and general appearance, as well as their resistance to shrinkage, creasing, and crushing.

One or more ingredients selected from a list comprising (1) waxes such as paraffin, spermaceti, lanolin, montan wax, ceresin, and beeswax, (2) plasticizing agents such as esters of high-boiling acids, for example esters of phthalic and phosphoric acids, and relatively high boiling aromatic and/or naphthenic oils; (3) other synthetic resins, such as resins prepared by the polymerization of other unsaturated hydrocarbons, vinyl chloride, vinyl acetate, acrylic acid and derivatives of acrylic acid, methacrylic acid and derivatives of methacrylic acid, vinylidene compounds, unsaturated aldehydes, and unsaturated ketones, as well as resins derived by the copolymerization of mixtures containing one or more of the foregoing, (4) derivatives of the foregoing resins, such as the sodium salt of polymerized acrylic or methacrylic acids, (5) rubber, both natural and synthetic, as well as derivatives thereof such as chlorinated rubber, (6) natural resins such as rosin, shellac, Congo, dammar, kauri, elemi, Pontiniak, and chicle, (7) pigments, (8) fillers, (9) coloring agents, such as dyes, lakes, and the like, (10) asphalt, both natural and artificial, pitches, gilsonite, and the like, (11) solvents, particularly hydrocarbon solvents, (12) cellulosic plastics such as cellulose nitrate and acetate, and the cellulose ethers, (13) gums, such as gum arabic and gum tragacanth, and (14) miscellaneous materials, such as gelatine, glue, casein, and the like, also may be added to resinous materials of the type described herein prior to, during, or after the application of the said resinous material to a surface or material to be coated and/or impregnated, or such added agents may be added to the surface or material prior to, during, or after the addition of the said resinous material.

I have found, however, that the application of resinous materials of the type described herein to surfaces and materials in general, and to organic materials, such as textiles and other woven, felted, knitted, or formed articles, in particular, is limited to some extent by the development of a definite and characteristic sweet flowery odor by such resinous material after application. The odor usually does not manifest itself immediately, but becomes apparent after storage periods at room temperature ranging from one day to several weeks or even longer.

As a result of extensive experimentation, I have found that this odor results from the superficial oxidation and/or decomposition of the resinous material, which may be catalyzed by the presence of certain other agents present on the material being coated, or contained in the resinous polymer solution, or emulsion prior to application, or both/or otherwise.

In the case of textiles and finished articles formed therefrom, this is a very undesirable phenomenon as the average person will not tolerate the development of any odor, however pleasant, in textiles or fabrics.

I have discovered that the formation of this odor can be eliminated, or its rate of formation greatly retarded by the incorporation of an antioxidant and/or inhibitor in the resinous material of the type described herein, prior to, during, or after the application of the said resinous material to the material to be coated and/or impregnated. For convenience of reference, these materials will be referred to herein as inhibitors.

While a number of such agents may be employed with varying degrees of success, I have discovered that excellent results are obtained when one or more agents selected from a list comprising (1) secondary amines containing one or more aryl or substituted aryl groups, (2) the reaction product of a ketone, such as acetone, and an aromatic amine, and (3) substituted and/or modified phenolic materials are added to the resin described.

Compounds of the first type may be represented by the following general formula

in which $R_1$ is a substituted or unsubstituted aryl, such as phenyl and naphthyl, aralkyl, such as tolyl and methyl phenyl, cycloparaffinic, such as cyclobutyl, cyclopentyl, cyclohexyl, cycloolefinic, such as cyclobutenyl, cyclopentenyl and cyclohexenyl, hydroaromatic such as dihydrophenyl, tetrahydrophenyl, or naphthenic, such as methyl cyclohexyl, ring or group, and in which R is a substituted or an unsubstituted aryl, aralkyl, alkyl, such as methyl, ethyl propyl, butyl, amyl, cycloparaffinic, cycloolefinic, hydroaromatic, or naphthenic ring or group such as is given for $R_1$. Included are secondary amines such as for example

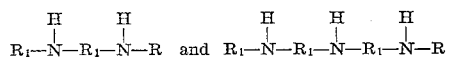

where R and $R_1$ have the same meaning as before, an intermediate $R_1$ having one less hydrogen atom as will be obvious.

Secondary amines containing one or more aryl or substituted aryl groups are preferred.

Examples of secondary amines which are particularly satisfactory when used as stabilizing agents for resins of the type described are diphenyl-p-phenylene diamine, phenyl beta naphthylamine, isopropoxydiphenylamine, aldol alpha naphthylamine (and polymers thereof), symmetrical di beta naphthyl-para-phenylenediamine, trimethyl dihydroquinoline (and polymers thereof), and the ditolylamines, and mixtures thereof.

For the sake of convenience in the specification and claims, these compounds will be referred to as secondary aryl amines.

Mixtures of certain of these secondary aryl amines also are excellent inhibiting agents for this purpose. Included among the mixtures which have been found particularly desirable are the commercial products known as "Age-Rite Exel," which is a mixture of isopropoxydiphenyl amine and diphenyl-p-phenylene diamine, "Age-Rite Hipar," which is a mixture of phenyl beta naphthylamine, isopropoxydiphenylamine, and diphenyl-p-phenylene-diamine, and "Age-Rite HP" which is a mixture of phenyl beta naphthylamine and diphenyl-p-phenylenediamine.

Compounds of the second type may be prepared by the reaction of a ketone, such as acetone, with an aryl amine, such as aniline, p-amino diphenyl, and diphenyl p-phenylene diamine. Examples of such products are known commercially as Flectol-B, Flectol-H and Santoflex-B.

Compounds of the third type may be represented by the general formula

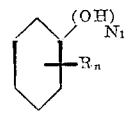

in which R may be hydrogen or an alkyl, such as methyl, ethyl, propyl, butyl, amyl, etc., aryl, such as phenyl, naphthyl, etc., aralkyl, such as methyl phenyl, alkyl-aryl, such as tolyl, xylyl, etc., substituted alkyl, such as halogen-substituted groups, for example chloro-methyl, and chloro-ethyl, hydroxy-substituted groups for example hydroxy-methyl and hydroxy-ethyl, amino-substituted groups, for example, amino-methyl and amino-ethyl and the like, substituted aryl, such as chloro-phenyl, hydroxy-phenyl, amino-phenyl, and the like, substituted aralkyl, such as chloro-, hydroxy-, and amino methylphenyl, substituted alkyl-aryl such as chloro-, hydoxy-, amino-tolyl, xylyl, etc., hydroxyl, amino, $SO_3H$, $SO_3Na$, $SO_3NH_2$, COOH, and COOA, where A is alkyl or aryl (examples of which have been given), and where $n$ and $N_1$ denotes that from 1 to 5 substituents may be attached to the ring. An example of a compound of this class is an alkylated polyhydroxy phenol.

Mixtures of two or more of the foregoing types of compounds also may be employed, if desired.

Although any desired quantity of inhibitor may be added to resins of the type described herein, I have found that the addition of from 0.1% to 10.0% by weight, based on the weight of resin present, is sufficient to stabilize the resin for a satisfactory period of time. From 0.5% to 5.0% will be found to be satisfactory for most purposes.

The inhibitor may be added to the resinous material in any desired manner. Thus, it may be mixed with the powdered or molten resin, or added in the form of a solution in a solvent and/or a plasticizing agent, after which the solvent and/or plasticizing agent may be removed, if desired. Other methods may, of course, be employed if desired.

The invention may be further illustrated by means of the following examples.

*Example 1*

An indene fraction obtained by the fractionation of light oil from oil gas boiling in the range of 175 to 190° C., and containing 70% indene, was mixed with toluene and polymerized with boron trifluoride diethyl ether complex at a temperature of 35° C. After neutralizing and removing the catalyst, a resin having an A. S. T. M. ball and ring softening point of 110° C. was obtained.

A portion of this resin was emulsified, using sodium oleate as the emulsifying agent. Approximately 5% by weight of Flectol-H, an inhibitor prepared by the condensation of acetone and aniline, was added to the molten resin during the emulsifying procedure.

Upon applying a portion of the resin emulsion to a strip of cloth and removing the volatile material, a satisfactory coating is obtained which is extremely resistant to the development of any odor.

*Example 2*

This is a repetition of Example 1, with the exception that the resin employed is obtained by the polymerization of a light oil substituted indene fraction boiling mainly in the range of 190 to 220° C.

The resinous coating obtained does not develop any perceptible odor upon exposure to the air.

While the invention has been described in considerable detail with respect to the use of certain indene type resinous polymers and one or more inhibitors as a coating and/or impregnating cloth, it is to be understood that such compositions also may be used for other purposes for which the stable properties of such resinous mixture make the compositions particularly applicable, such as the use of such compositions for impregnating and/or coating organic and inorganic fibers, fabrics, and finished articles in general, for the preparation of adhesives, cements, and joining compositions, for the preparation of coating compositions for a large variety of applications, and for the preparation of plastic masses in general.

It is to be understood, also, that the above specific examples are by way of illustration. Therefore, changes, omissions, additions, substitutions, and/or modifications may be made within the scope of the claims without departing from the spirit of the invention.

I claim:

1. A new composition of matter comprising resinous polymer produced by the polymerization with the aid of a resin-producing catalyst of a light oil indene fraction obtained from the products of pyrolysis of petroleum oil and boiling preponderantly in the range of from 175 to 190° C. and containing indene as the preponderant unsaturated hydrocarbon present; and from 0.1 to 10% by weight based on said polymer of an antioxidant stabilizing agent comprising a product resulting from the reaction of acetone with aniline; said resinous polymer in the absence of an antioxidant stabilizing agent being subject to considerable oxidation on prolonged contact with air at room temperature.

2. A new composition of matter comprising resinous polymer produced by the polymerization with the aid of a resin-producing catalyst of a light oil fraction obtained from the products of pyrolysis of petroleum oil selected from the group consisting of the indene fraction boiling preponderantly in the range of 175 to 190° C. and containing indene as the preponderant unsaturated hydrocarbon present and a similarly derived methyl indene fraction boiling preponderantly in the range of 190 to 220° C. and containing methyl indene as the preponderant unsaturated hydrocarbon present; and from 0.1 to 10% by weight based on said polymer of an antioxidant stabilizing agent comprising a product resulting from the reaction of acetone with aniline; said resinous polymer in the absence of an antioxidant stabilizing agent being subject to considerable oxidation on prolonged contact with air at room temperature.

3. A new composition of matter comprising resinous polymer produced by the polymerization with the aid of a resin-producing catalyst of a light oil fraction obtained from the products of pyrolysis of petroleum oil selected from the group consisting of the indene fraction boiling preponderantly in the range of from 175 to 190° C. and containing indene as the preponderant unsaturated hydrocarbon present and a similarly derived methyl indene fraction boiling preponderantly in the range of 190 to 220° C. and containing methyl indene as the preponderant unsaturated hydrocarbon present; and from 0.1 to 10% by weight based on said polymer of an antioxidant stabilizing agent comprising a product resulting from the reaction of acetone with an aryl amine selected from the group consisting of aniline, p-amino diphenyl and diphenyl p-phenylene diamine; said resinous polymer in the absence of an antioxidant stabilizing agent being subject to considerable oxidation on prolonged contact with air at room temperature.

4. A new composition of matter comprising resinous polymer produced by the polymerization with the aid of a resin-producing catalyst of a light oil methyl indene fraction obtained from the products of pyrolysis of petroleum oil and boiling preponderantly in the range of 190 to 220° C. and containing methyl indene as the preponderant unsaturated hydrocarbon present; and from 0.1 to 10% by weight based on said polymer of an antioxidant stabilizing agent comprising a product resulting from the reaction of acetone with aniline; said resinous polymer in the absence of an antioxidant stabilizing agent being subject to considerable oxidation on prolonged contact with air at room temperature.

5. A new composition of matter comprising resinous polymer produced by the polymerization with the aid of a resin-producing catalyst of a light oil indene fraction obtained from the products of pyrolysis of petroleum oil and boiling preponderantly in the range of 175 to 190° C. and containing indene as the preponderant unsaturated hydrocarbon present; and from 0.1 to 10% by weight based on said polymer of an antioxidant stabilizing agent comprising a product resulting from the reaction of acetone with an aryl amine selected from the group consisting of aniline, p-amino diphenyl and diphenyl p-phenylene diamine; said resinous polymer in the absence of an antioxidant being subject to considerable oxidation on prolonged contact with air at room temperature.

6. A new composition of matter comprising resinous polymer produced by the polymerization with the aid of a resin-producing catalyst of a light oil methyl indene fraction obtained from the products of pyrolysis of petroleum oil and boiling preponderantly in the range of 190 to 220° C. and containing methyl indene as the preponderant unsaturated hydrocarbon present; and from 0.1 to 10% by weight based on said polymer of an antioxidant stabilizing agent comprising a product resulting from the reaction of acetone with an aryl amine selected from the group consisting of aniline, p-amino diphenyl and diphenyl p-phenylene diamine; said resinous polymer in the absence of an antioxidant being subject to considerable oxidation on prolonged contact with air at room temperature.

FRANK J. SODAY.

REFERENCES CITED

The following references are of record in the file of this patent:

UNITED STATES PATENTS

| Number | Name | Date |
|---|---|---|
| 2,015,696 | Semon | Oct. 1, 1935 |
| 2,138,895 | Wiezevich | Dec. 6, 1938 |
| 2,160,172 | Rosen | May 30, 1939 |
| 2,268,418 | Paul | Dec. 30, 1941 |
| 2,318,758 | Craig | May 11, 1943 |

FOREIGN PATENTS

| Number | Country | Date |
|---|---|---|
| 345,939 | Great Britain | Mar. 6, 1931 |